(12) United States Patent
Sloss

(10) Patent No.: US 8,059,486 B2
(45) Date of Patent: Nov. 15, 2011

(54) METHOD OF RENDERING VOLUME REPRESENTATION OF SONAR IMAGES

(75) Inventor: Martyn Sloss, Fife (GB)

(73) Assignee: Coda Octopus Group, Jersey City, NJ (US)

( * ) Notice: Subject to any disclaimer, the term of this patent is extended or adjusted under 35 U.S.C. 154(b) by 0 days.

(21) Appl. No.: 12/103,839

(22) Filed: Apr. 16, 2008

(65) Prior Publication Data

US 2011/0110194 A1    May 12, 2011

(51) Int. Cl.
  *G01S 15/88* (2006.01)
(52) U.S. Cl. .......................................... 367/88; 367/72

(58) Field of Classification Search ............... 367/7, 68, 367/72, 88
See application file for complete search history.

(56) References Cited

U.S. PATENT DOCUMENTS

| | | | |
|---|---|---|---|
| 6,438,071 B1 * | 8/2002 | Hansen et al. | 367/88 |
| 7,363,177 B2 * | 4/2008 | Intrator et al. | 702/79 |

* cited by examiner

*Primary Examiner* — Ian Lobo
(74) *Attorney, Agent, or Firm* — Rodney T Hodgson

(57) ABSTRACT

Sonar imaging data is reduced by assigning partially reflective and/or opaque two dimensional areas for each data point to a series of planes. The reflectivity and/or transmission of light from the areas is calculated and used to construct an image.

17 Claims, 4 Drawing Sheets

METHOD OF RENDERING VOLUME REPRESENTATION OF SONAR IMAGES

RELATED PATENTS AND APPLICATIONS

U.S. Pat. No. 6,438,071, issued to Hansen, et al. on Aug. 20, 2002, and entitled "Method for producing a 3D image"; U.S. Pat. No. 7,466,628, issued to Hansen on Dec. 16, 2008; U.S. Pat. No. 7,489,592, issued to Hansen on Feb. 10, 2009; US Patent Publication 20080302115 by Eknes; Erik; et al. filed 8 Jun. 2007 and published Dec. 11, 2008; are related to the present application. The above identified patents, patent publications, and patent applications are assigned to the assignee of the present invention and are incorporated herein by reference in their entirety including incorporated material.

BACKGROUND OF THE INVENTION

Field of the Invention

The field of the invention is the field of sonar imaging.

OBJECTS OF THE INVENTION

It is an object of the invention to produce a method of treating sonar data returned to an array sonar detector to improve image quality.

SUMMARY OF THE INVENTION

Sonar data is typically returned as a very sparse and very noisy three dimensional matrix. The method of the invention reduces the data from points in a volume to two dimensional circles on a set of two dimensional planes arranged in the three dimensional space. An optical image of the sonar data is then constructed by calculating the interaction of light with the circles, wherein the circles have defined reflectivity and/or opacity characteristics.

DETAILED DESCRIPTION OF THE INVENTION

Figure 1:
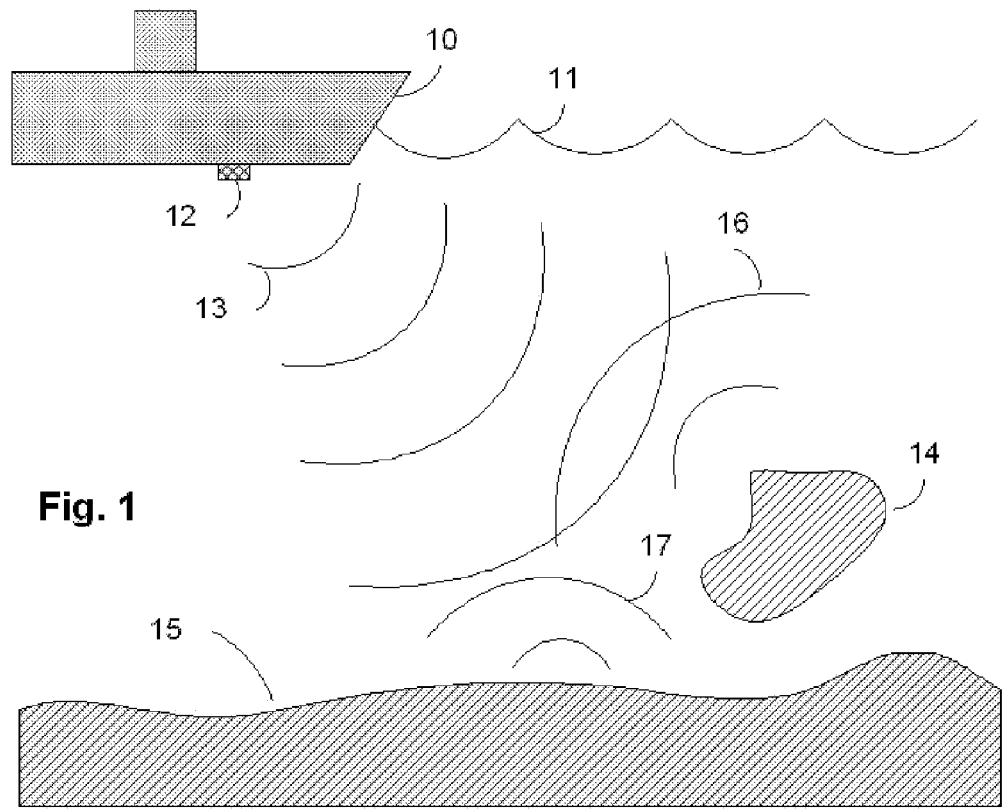
FIG. 1 shows a sketch of a typical use of the method of the invention.

It has long been known that data presented in visual form is much better understood by humans than data presented in the form of tables, charts, text, etc. However, even data presented visually as bar graphs, line graphs, maps, or topographic maps requires experience and training to interpret them. Humans can, however, immediately recognize and understand patterns in visual images which would be impossible for even the best and fastest computers to pick out. Much effort has thus been spent in turning data into images.

In particular, images which are generated from data which are not related to light are difficult to produce. One such type of data is sonar data, wherein a sound waves are sent out from a generator into a volume of fluid, and the reflected sound energy from objects in the ensonified volume is recorded by a multielement detector. The term "ensonified volume" is known to one of skill in the art and is defined herein as being a volume of fluid through which sound waves are directed.

The sonar data from such multielement detectors is generally recorded as points in three dimensional space as a function of range and of two orthogonal angles. These data in polar coordinate space are in turn generally reduced and presented as data from a three dimensional Cartesian coordinate space. The data may then be presented as height above the sea bed, for example, or depth below the surface, as a "z" coordinate, while the x and y coordinates could be chosen as west and north, for example. In other examples, the x or y coordinate could be chosen to be parallel to a wall or other long, mostly straight object.

One characteristic of sonar data is that it is very sparse, as the ensonified volume is generally water having only one or a few objects of interest. The volume of the fluid is generally divided into a series of cubes, and data is returned from a small percentage of the cubes. The resolution of the sonar is proportional to the linear dimension of the cubes, while the computation cost of recording the signal from each detector element and calculating from whence the signals have come is inversely proportional to the cube dimensions to the third power. There is then a tradeoff between resolution and computer power and time taken to produce an image from received data.

In other imaging technologies, the data are very dense. In an art unrelated to sonar imaging, medical imaging essentially has signals from each voxel, and the techniques for such imaging as CT scans, MRI scans, PET scans, and Ultrasound Imaging is not applicable to the sparse sonar data. In the same way, signals from sound waves sent out from the earths surface into the depths to return data of rock formations in the search for oil produce dense data, and techniques developed for such fields would not in general be known or used by one of skill in the art of sonar imaging.

The present invention is used to treat the sparse data from sonar imaging equipment to produce images which would be comparable to an optical image of a submerged object, if the object could in fact be seen through turbid water or other fluid.

FIG. 1 shows a typical sonar imaging system where a vessel 10 floats on the surface 11 of the sea. A sound navigation and ranging (SONAR) receiver 12 is attached to the bottom of the vessel, or alternatively may be strung by a cable from the vessel, or alternatively may be in a remotely operated vehicle (ROV) which sends data to the vessel. The vessel may be a surface vessel as shown, a submarine, or an independently operating ROV.

A single sonar pulse is shown as a wave front 13 propagating from a sonar transmitter attached to the vessel 10. Typically, the pulse would be very short, and the sound energy would be concentrated in a narrow region around the outgoing line shown as a front 13. The sonar pulse could spread out very broadly, as shown, or could be concentrated as a directed beam by suitable use of multiple phased sonar transmitters.

FIG. 1 shows an object 14 suspended above the seabed 15. Sound waves 16 and 17 are shown schematically reflected from surfaces of the object and the seabed. The reflected sound waves are received at the sonar receiver 12. If the receiver 12 is a multielement receiver, the direction from which reflected waves come and the range of the object or the seabed can be calculated. In effect, each element of the multielement receiver measures the pressure versus time of the sound waves impinging on the detector. The phase and intensity of the various beating waves can be measured much as the phase and intensity of electromagnetic waves can be measured in an interferometer. The resulting pattern gives, in effect, a hologram which describes the three dimensional positions of the objects scattering the known sound waves. Thus, the origin of each received signal can be traced to a point in the three dimensional volume. The points of origin, intensities of signal, etc are recorded and analyzed by computer to give image data describing the objects in the three dimensional volume. For typical sonar data, no signal is recorded as originating from most points in the volume, and the data are very sparse. In general, data are presented by presenting the range from which either the maximum signal (MAX) is received or the first above a threshold (FAT) signal is received. The range is presented normally as a function of two polar angles, and such presentation requires the fewest computer calculations on the recorded data. Note that the recorded data contains much more information than a mere range vs angle image.

Note that the sent out sonar pulse 13 can be generated using a sonar pulse generator which is either near to or separated from the receiver 12. In particular, a sonar pulse generator may be in an ROV, in a fixed position with respect to the seabed, or in any other fixed or movable position with respect to the sonar receiver 12.

Figure 2:
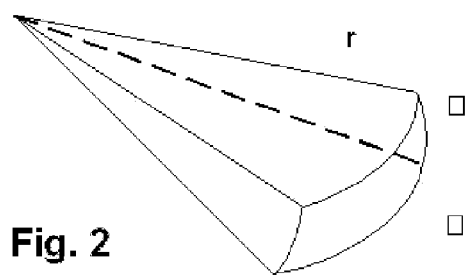
FIG. 2 shows a sketch of a polar coordinate system.
Figure 3:
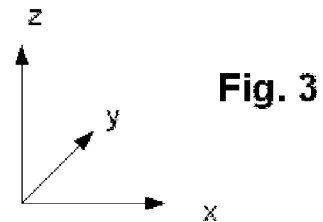
FIG. 3 shows a sketch of the most preferred Cartesian coordinate system of the invention.

FIG. 2 shows a coordinate system naturally suited to a pulse generated and sent out from a single point with two orthogonal angular coordinates $\phi$ and $\theta$, and a ranging coordinate r describing the ensonified volume. Typically, the data returned from coordinates (r, $\theta$, $\phi$) from a single pulse are transformed to data from coordinates x, y, and z such as shown in FIG. 3. In this way, multiple data from a series of sent out pulses can be transformed to the same coordinate system which is fixed as the vessel 10 moves in x, y and z and/or pitches, yaws and rolls.

Figure 4:
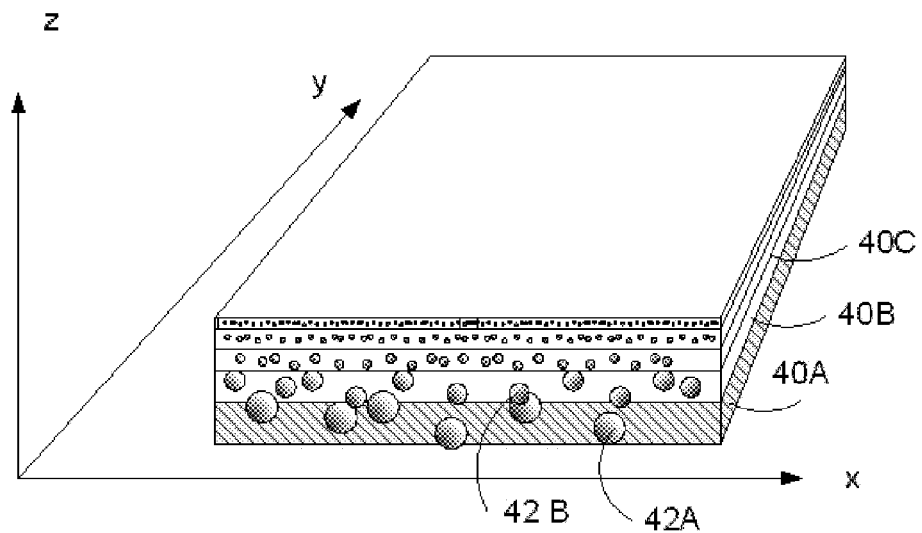
FIG. 4 shows a sketch of an ensonified volume partitioned into slabs in accordance with the most preferred method of the invention.

FIG. 4 shows a step in the treatment of the data returned from the ensonified volume. The volume is partitioned into a series of slabs 4A, 4B, 4C etc. having one dimension z (thickness) less than the other two dimensions (in the example shown, the x and y dimension.) The slabs are shown flat, parallel and touching one another to take advantage of the coordinate system, but the inventor anticipates that the space could be adequately represented by non flat slabs which do not have exactly parallel sides, and which sides are not exactly parallel to the adjacent slabs. The slabs are shown having varying thickness, which in the most preferred embodiment of the invention is a thickness determined by the desired resolution. However, slabs of equal thickness or slabs having a different dependence of thickness and slabs with normals in any defined direction are anticipated by the inventor.

In the example shown, one desired resolution is a resolution which is proportional to the range. That is, the nearer the data point is to the sonar sender and receiver, the higher should be the resolution and the smaller the resolution element.

Points in the ensonified volume from which the data are returned are assigned a data point volume 42A, 42B etc as shown in the sketch of FIG. 4. The volumes are shown as spheres having the center point of the sphere at the point where the computation records as the origin of a signal, but any volumetric three dimensional object such a cubes, tetrahedron, etc can serve as well. The volumes of the data point volumes are determined according to a criterion. In the most preferred embodiment of the invention, the volumes are spheres, and the diameter of the spheres is set equal to the desired resolution at the range of the data points.

In order to reduce the three dimensional data to a set of two dimensional data sets, a two dimensional plane is defined for each three dimensional slab 40A, 40B etc.

Figure 5:
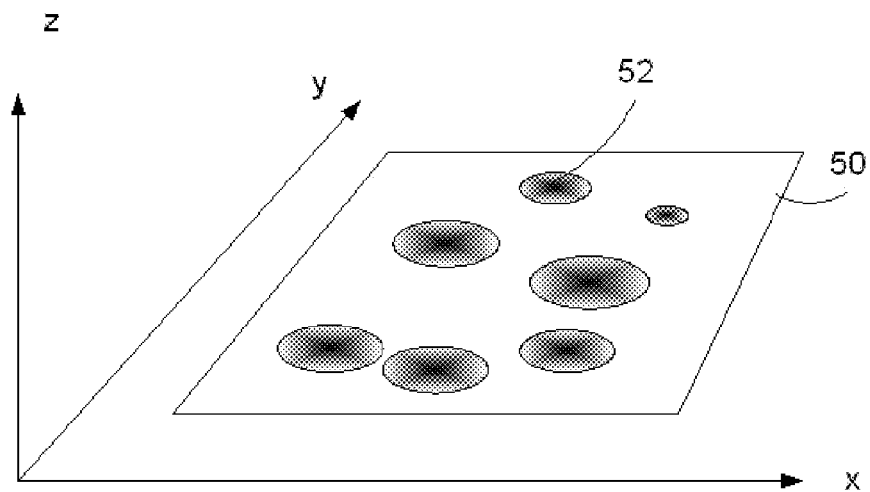
FIG. 5 shows a sketch of a plane associated with a slab of FIG. 4.

FIG. 5 shows the most preferred embodiment, where the planes are parallel to the surface of the slab and in the center of the slab. FIG. 5 shows one such slab. Then, a two dimensional mathematical object is assigned to each data point volume which intersects the slab. In the sketch of FIG. 5, the two dimensional mathematical objects are circles. The two dimensional mathematical objects have an area which is a determined function. In the most preferred embodiment of the invention, the area of the mathematical objects is a function of the desired resolution. In the most preferred embodiment, the diameter of the circles is the same as the diameter of the spheres and is equal to the desired resolution at the range of the data points.

The circles of FIG. 5 are shown shaded. An intensity function is assigned to the circles. The intensity function may be an opaqueness function, a reflectivity function, or a combination of both reflectivity and opaqueness. In the example shown, the intensity varies from a high at the center of the circle to a low at the edge of the circle. Any mathematically tractable function may be used. The most preferred function is a Gaussian function, but a cosine or cosine squared function, or any other function would do as well. Thus, if the intensity function is an opaqueness function, when an image is calculated by calculating how much light propagates through a series of planes with the circles, light from the back is not 100% blocked by a circle in the front plane. The circles may also be colored. One criterion for coloring of the circles is the range, with various ranges corresponding to different colors. Another criterion for coloring may be the intensity of the returned signal from the data point. Thus, hard highly reflecting material would be colored differently than signals from soft mud, for example.

The advantage of the method of the invention is that signals from the "front" voxels do not necessarily block signals from the "rear" voxels. In prior art imaging, the range of the data point is determined by either the Maximum Intensity criterion (MAX) of the signals from that direction, or by a "first above threshold" (FAT) criterion. If the size of the voxel is set low, the signal is very noisy, and if set high, the front voxels block signals from the rear voxels.

Figure 6:
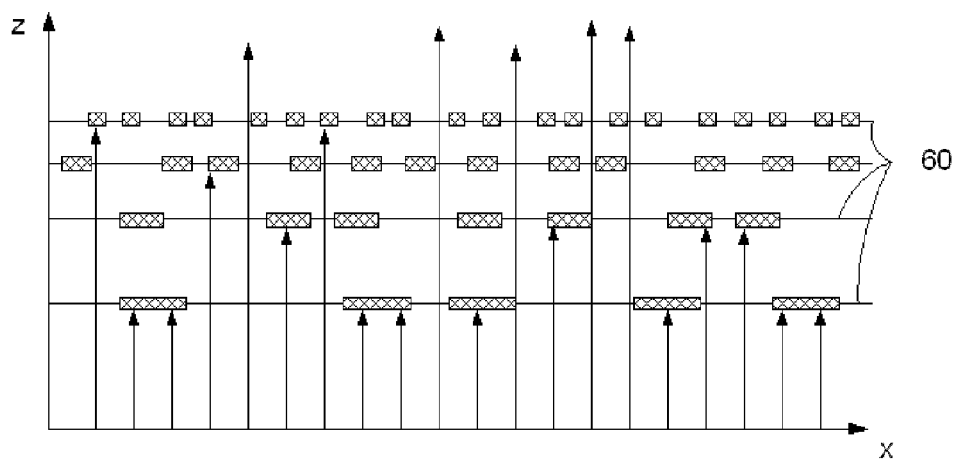
FIG. 6 shows a sketch of light propagating through a series of planes of FIG. 5.

FIG. 6 shows light propagating from the rear of a set of planes through completely opaque sections where the sections are bigger on the bottom of the drawing than on the top. This figure corresponds to the circles of FIG. 5 being completely opaque from the center of the circle to the edges of the circles. The most preferred method of the invention, where the light is partially transmitted through the perimeters of each of the areas on each plane shown, is not shown.

Figure 7:
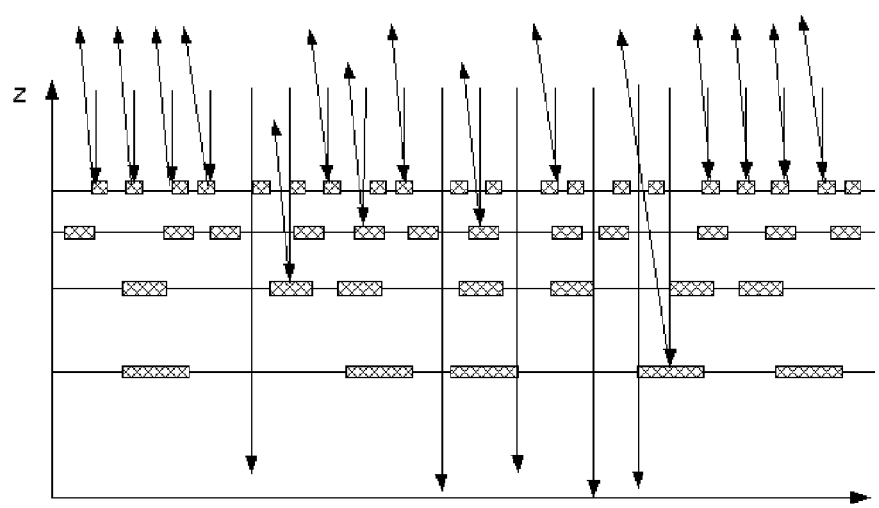
FIG. 7 shows a sketch of light reflecting from a series of planes of FIG. 5.

FIG. 7 shows a sketch of the invention where the intensity function is a reflectivity function. Light is shown incident on the circles, an bouncing off to return to a virtual optical image recorder. Once again, a reflectivity function is shown as completely reflective from each of the areas. The combination of reflective and opaque circles can be handled easily by computer. Light would be reflected from each area according to a determined function, and the partially transmitted light through the open areas and the partially reflecting and absorbing areas would be transmitted to a lower plane, there reflected and absorbed, and the total return light calculated as a function of the x and y coordinates, and an image generated for any type of optical illumination.

Figure 8:
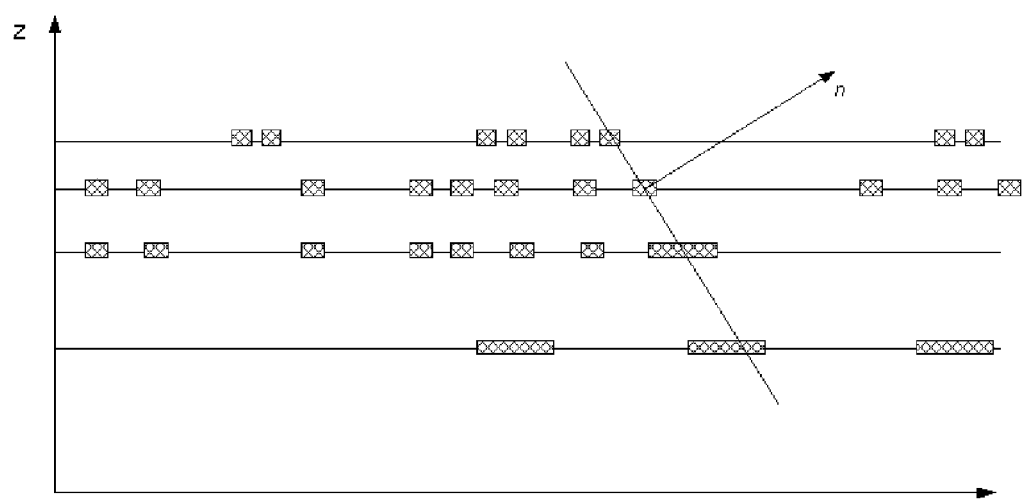
FIG. 8 shows a sketch of fitting a plane to neighboring points in order to construct the normal to the plane.

FIG. 8 shows a series of planes in cross section. It is a preferred embodiment of the invention to construct normal vectors for each data point which specify the slope of the surface which includes the data point. The normal vector is calculated by fitting a plane through the data point and its neighbors, and taking the normal direction to the fitted plane. Now, the reflectivity of light into any direction from the point on the surface can be calculated if light were to impinge from a known direction with respect to the normal vector. The specular and diffuse reflectivity of the surface may be known or assumed. For example, high intensity signals returned from a hard surface could be assigned a more specular reflectivity than low intensity signals from a soft surface.

In the simplest approximation of FIG. 8, if a slope dz/dx and dz/dy is required for a point (x, y), then z measured for points (x, y), (x+1, y), and (x, y+1), and the slope calculated.

In a more preferred embodiment, for a pixel (x,y)

$$dz/dx=\{(x+1,y)-(x-1,y)\}/2$$

and $$dz/dy=\{(x,y+1)-(x,y-1)\}/2$$

The most preferred embodiment, which unfortunately also consumes the most computer time, uses more data points around (x,y) and fits the best plane. Then the normal to the plane is calculated.

In a preferred embodiment, if the z values change by dz=0.0 m between pixels, the pixel intensity is set to 1 (i.e. brightest). If 0.0 m<dz<0.5 m, the intensity of the pixel is set to 2 times dz (i.e. varies between 0 and 1), and if dz>0.5 m the pixel intensity is set to 0 (i.e. black). This embodiment is of particular value when rapid displays of the original data of range vs x and y are desired.

A series of color images of data are appended in an appendix, and an explanation of the images is attached thereto.

Obviously, many modifications and variations of the present invention are possible in light of the above teachings. It is therefore to be understood that, within the scope of the appended claims, the invention may be practiced otherwise than as specifically described.

I claim:

1. A method of statistically analyzing sonar data returned from a large plurality of points in a three dimensional volume of space, comprising:
   a) insonifying the three dimensional volume of space with at least one sonar pulse;
   b) partitioning the volume of space into a plurality of adjacent three dimensional slabs, the three dimensional slabs having adjacent sides substantially parallel with each other, wherein the thickness of each of the three dimensional slabs is equal to a defined resolution at the position of each three dimensional slab; then
   c) defining a two dimensional surface associated with each three dimensional slab;
   d) assigning a data point volume to each of the large plurality of points, the data point volume determined according to a first criterion; then
   e) defining a two dimensional mathematical object in each two dimensional surface for each data point volume, the area of the two dimensional mathematical object determined by a second criterion,
   f) assigning an intensity function to each of the two dimensional mathematical objects according to a third criterion;
   g) constructing an image from the two dimensional mathematical objects.

2. The method of claim 1, wherein the three dimensional slabs are non overlapping flat slabs, and the two dimensional surface associated with each slab is within the associated slab.

3. The method of claim 2, wherein the volume associated with each point of the large plurality of points is a sphere including the point, and wherein the radius r of the sphere is a function of the range of the data point from a position of a detector.

4. The method of claim 3, wherein the area of the two dimensional mathematical object is the area of a circle of radius r.

5. The method of claim 3, wherein the area of the two dimensional mathematical object is a function of the intersection of the volume associated with each point and a slab.

6. The method of claim 1, wherein the intensity function assigned to the two dimensional mathematical objects is greater in the center of the objects than on the perimeter of the objects.

7. The method of claim 6, wherein the two dimensional mathematical objects are circles and the intensity function is a Gaussian function having maximum in the center of the circle.

8. The method of claim 7, wherein the intensity function is an opacity function.

9. The method of claim 8, wherein the transmission of light through the two dimensional surfaces and through the partially opaque circles is calculated to create an image.

10. The method of claim 7, wherein the intensity function is an reflectivity function.

11. The method of claim 10, wherein the reflection of light from the reflective circles is calculated to create an image.

12. The method of claim 7, wherein the intensity function is a combination reflectivity and an opacity function.

13. The method of claim 12, wherein the reflection and transmission of light from the reflective, partially opaque circles is calculated to create an image.

14. The method of claim 1, wherein a vector is associated with at least one point of the large plurality of points, the vector being the normal to a plane fit to a group of points of the large plurality of points which are neighbors to the at least one point, and wherein the is vector used in constructing the image.

15. The method of claim 1, further comprising the three dimensional volume of space with an additional plurality of sonar pulses, and repeating steps d) to g) for each pulse, then
   h) stitching all the images together to produce an averaged image.

16. A method of presenting sonar imaging data, comprising:
   a) projecting a sound wave into a sound wave transmitting medium;
   b) receiving sound waves reflected from one or more objects in the sound wave transmitting medium, each of the one or more objects having a defined three dimensional location in the sound wave transmitting medium;
   c) transforming the reflected sound waves into electrical signals, the electrical signals comprising the sonar imaging data;
   d) analyzing the electrical signals to record at least the three dimensional locations of the one or more objects, wherein in the electrical signals are analyzed by a processor e) constructing a two dimensional image from the three dimensional imaging data, the two dimensional image comprising pixels arranged as an array, wherein each pixel conveys information;

wherein step e) comprises i) partitioning the volume of space into a plurality of adjacent three dimensional slabs, the three dimensional slabs having adjacent sides substantially parallel with each other, wherein the thickness of each of the three dimensional slabs is equal to a defined resolution at the position of each three dimensional slab; then ii) defining a two dimensional surface associated with each three dimensional slab;

iii) assigning a data point volume to each of the large plurality of points, the data point volume determined according to a first criterion; then iv) defining a two dimensional mathematical object in each two dimensional surface for each data point volume, the area of the two dimensional mathematical object determined by a second criterion, v) assigning an intensity function to each of the two dimensional mathematical objects according to a third criterion;

vi) constructing an image from the two dimensional mathematical objects.

17. The method of claim 16, wherein the two dimensional image is displayed on a display device.

* * * * *